United States Patent
Gui et al.

(10) Patent No.: US 6,826,905 B2
(45) Date of Patent: Dec. 7, 2004

(54) CONTROL STRATEGY FOR REGENERATING A PARTICULATE FILTER IN AN EXHAUST SYSTEM OF AN ENGINE HAVING A VARIABLE VALVE ACTUATION MECHANISM

(75) Inventors: Xinqun Gui, Naperville, IL (US);
Jinhui Sun, Bloomington, IL (US);
Steven T. Omachi, Niles, IL (US);
Xiaoyan Lei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 23 days.

(21) Appl. No.: 10/161,757

(22) Filed: Jun. 4, 2002

(65) Prior Publication Data

US 2003/0221421 A1 Dec. 4, 2003

(51) Int. Cl.[7] ................................................. F01N 3/00
(52) U.S. Cl. .............................. 60/295; 60/274; 60/285; 60/300; 60/311; 123/90.15
(58) Field of Search ........................ 60/274, 285, 295, 60/297, 311; 123/90.15

(56) References Cited

U.S. PATENT DOCUMENTS

| | | | | |
|---|---|---|---|---|
| 5,293,741 A | * | 3/1994 | Kashiyama et al. | .......... 60/284 |
| 5,398,502 A | * | 3/1995 | Watanabe | .................. 60/284 |
| 6,032,753 A | * | 3/2000 | Yamazaki et al. | ......... 180/65.3 |
| 6,164,064 A | * | 12/2000 | Pott | ............................ 60/277 |
| 6,494,173 B2 | | 12/2002 | Takahashi et al. | |
| 2002/0189240 A1 | | 12/2002 | Allevag et al. | |

FOREIGN PATENT DOCUMENTS

| | | | |
|---|---|---|---|
| JP | 03-271515 | * | 12/1991 |
| JP | 08-158897 | * | 6/1996 |

* cited by examiner

Primary Examiner—Thomas Denion
Assistant Examiner—Diem Tran
(74) Attorney, Agent, or Firm—Dennis Kelly Sullivan; Susan L. Lukasik; Jeffrey P. Calfa

(57) ABSTRACT

A control (30) for controlling a variable valve actuation mechanism (26) of an internal combustion engine (10) to regenerate a particulate filter (35) in the exhaust system (25) of the engine. The control comprises an operating program (50, 50A) for regenerating the particulate filter while the engine is running under its owns power by causing the variable valve actuation mechanism to change the timing of engine cylinder valves during an engine operating cycle, and as a result, elevate the temperature of flow through the exhaust system to a temperature that is effective to combust particles trapped by the filter.

13 Claims, 3 Drawing Sheets

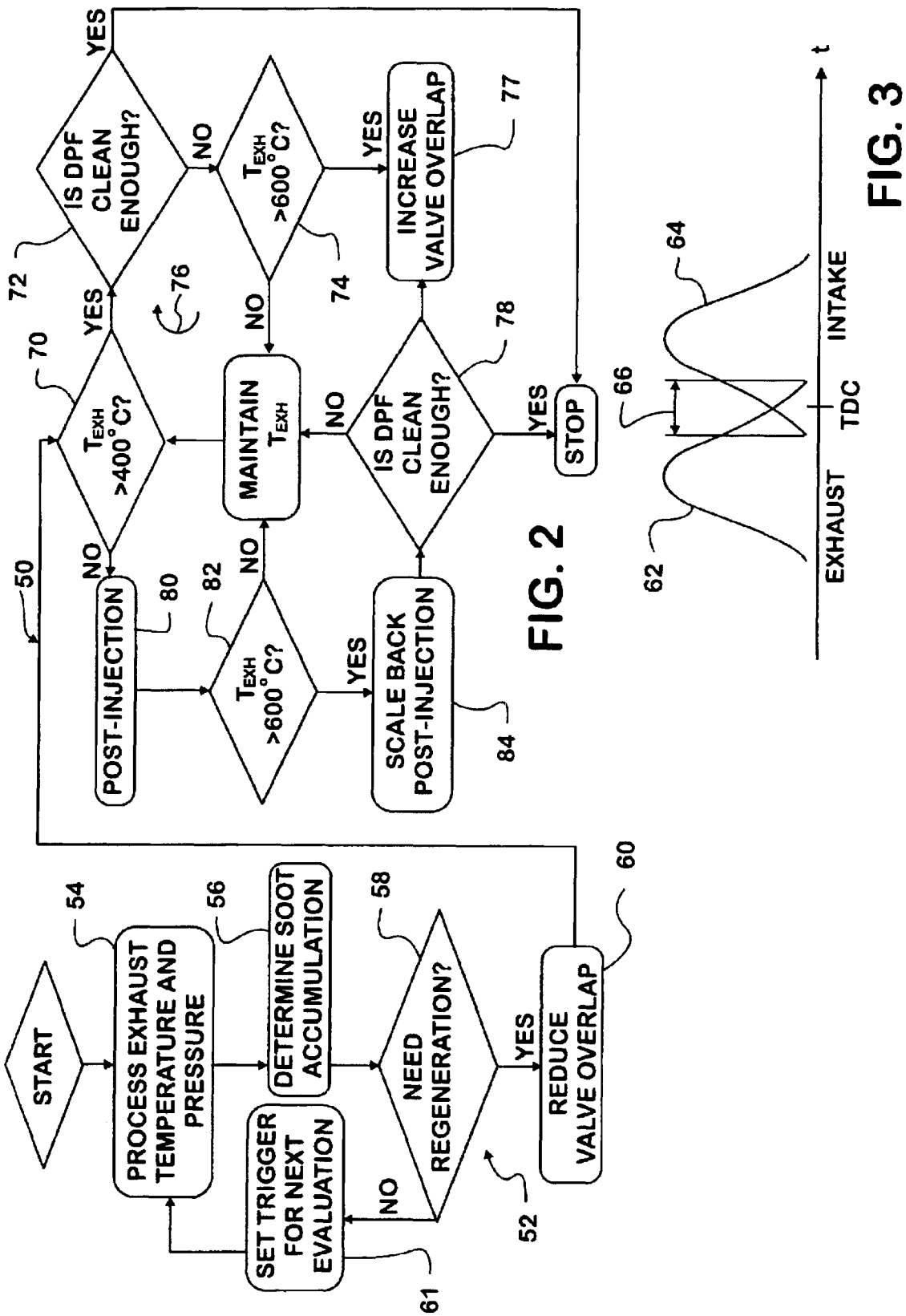

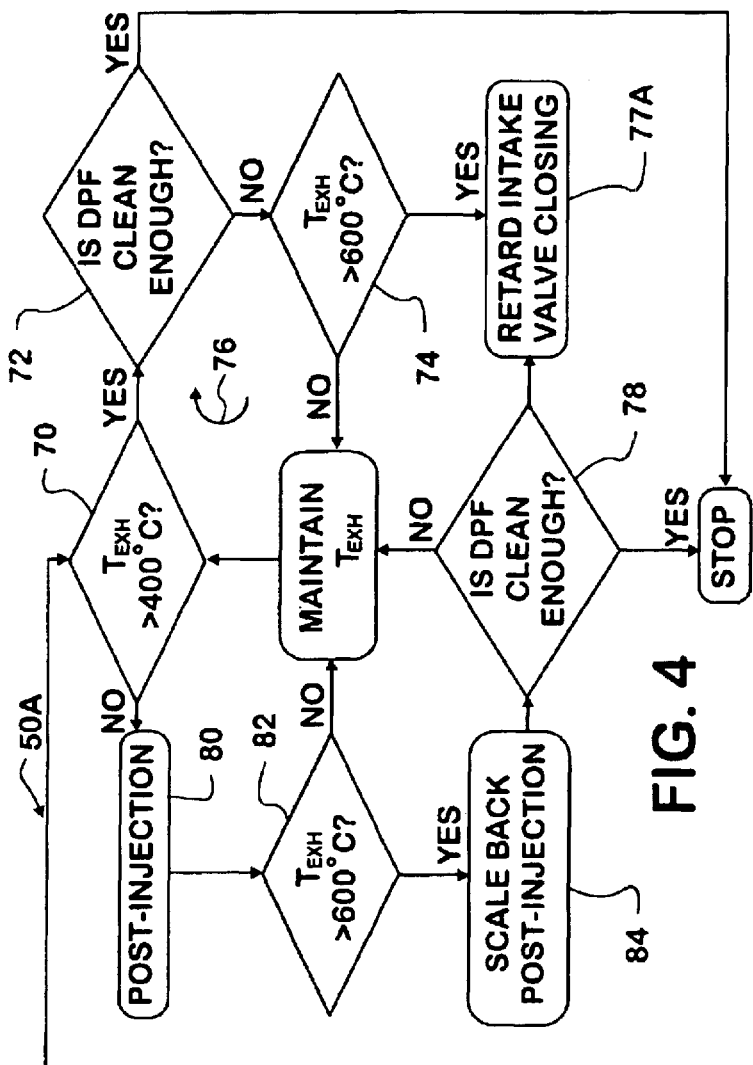
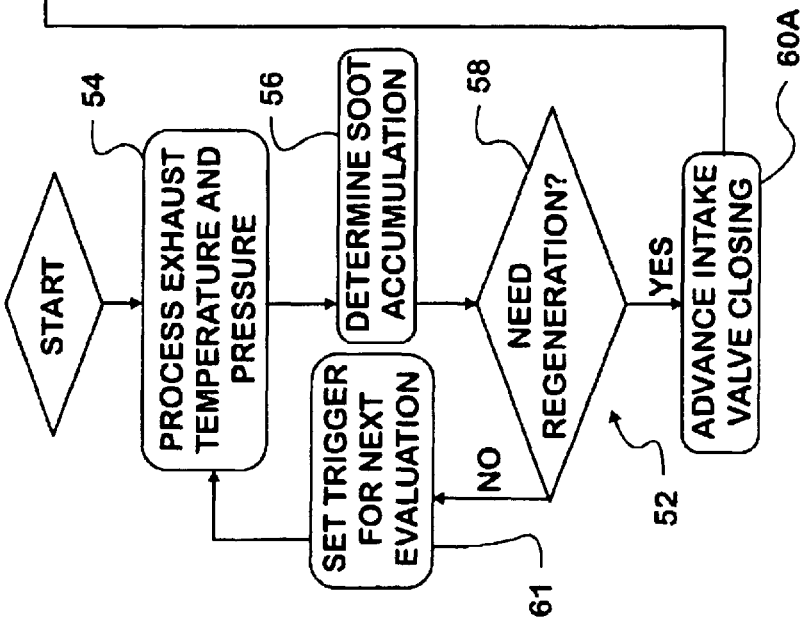
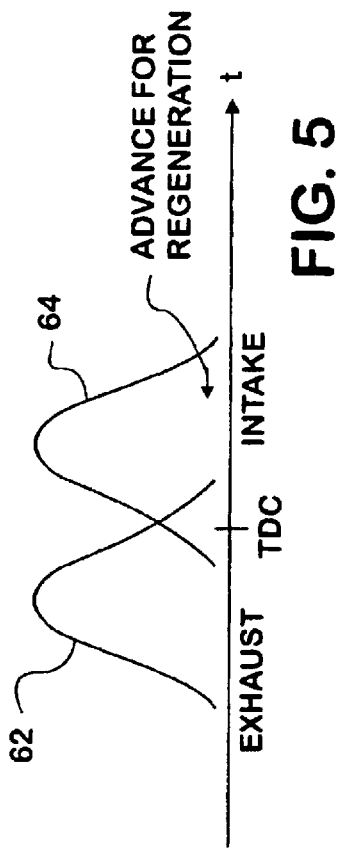
FIG. 4
FIG. 5

CONTROL STRATEGY FOR REGENERATING A PARTICULATE FILTER IN AN EXHAUST SYSTEM OF AN ENGINE HAVING A VARIABLE VALVE ACTUATION MECHANISM

FIELD OF THE INVENTION

This invention relates generally to internal combustion engines that propel motor vehicles and are equipped both with a variable valve actuation mechanism and with an exhaust system having a particulate filter for trapping particulates in engine exhaust. A more particular aspect of the invention relates to a control strategy for regenerating the particulate filter through use of the variable valve actuation mechanism.

BACKGROUND AND SUMMARY OF THE INVENTION

A particulate, or soot, filter may be placed in the exhaust system of an engine, especially a diesel engine, to trap soot that would otherwise be emitted to the surrounding atmosphere. As the engine accumulates more operating time, more soot becomes trapped in the filter. Eventually the amount of accumulated soot begins to affect performance, and so it becomes necessary to purge the filter of trapped soot.

Because the soot is essentially carbon, a known process for purging the soot is to combust it into carbon dioxide by temporarily elevating the temperature of the exhaust passing though it to a sufficiently high temperature and providing sufficient oxygen. This process is known as regeneration. A known technique for elevating the temperature of the exhaust is by altering the timing and the amount of fueling of the engine.

It is believed that the present invention provides a better strategy for regenerating the filter. When an engine has a variable valve actuation mechanism under control of a processor-based engine control, the timing of intake valve opening and closing and the timing of exhaust valve opening and closing can be varied. The invention arises from the discovery that the variable valve actuation mechanism can be used to vary the exhaust temperature. In particular, it has been found that reducing the amount of valve overlap during a certain portion of the engine operating cycle can temporarily elevate engine exhaust temperature sufficiently to regenerate a soot filter that has been trapping soot in the exhaust. As a piston is approaching top dead center (TDC) to complete an exhaust stroke, the exhaust valve for the corresponding cylinder is beginning to close. It attains full closure at or near TDC. At or near TDC, the corresponding intake valve is beginning to open. Valve overlap occurs during that fraction of the engine cycle when both valves are simultaneously open. By decreasing the amount of valve overlap, i.e. by decreasing the fraction of an engine operating cycle for which both intake and exhaust valves for a respective cylinder are simultaneously open as a piston in the respective cylinder approaches top dead center to complete an exhaust stroke, the temperature of the flow leaving the cylinders and passing through the exhaust system can be elevated to a temperature that is effective to combust particles that have been trapped by the filter, thereby regenerating the filter.

Supplemental heating of the exhaust may be appropriate if the exhaust temperature is below a low temperature limit when valve overlap is initially decreased. The supplemental heating represents an additional action that can be taken by altering the injection of fuel in conjunction with the decrease in valve overlap.

Principles of the invention can be embodied in an engine control as part of an overall engine control strategy. The creation of an engine and an operating strategy that can regenerate a particulate filter in conjunction with an overall control strategy, is seen to be a desirable objective because it can make the regeneration process transparent to an operator of the vehicle, requiring no special measures on his or her part. The present invention attains the desired objective through the control of the variable actuation mechanism for the engine cylinder valves by an engine control system embodying solid-state, processor-based electronics. The processor can process certain data inputs to develop data outputs defining valve opening and closing times that are most appropriate to the inventive strategy. The data outputs are converted into electric signals that are delivered via electric circuits to actuators of the variable valve actuation mechanism to open and close the intake and exhaust valves at proper times for accomplishing regeneration.

Because certain principles of the present invention include changing the time in the engine operating cycle when the intake and exhaust valves for the engine cylinders open and close, the variable valve actuation mechanism of the engine must be effective on each such cylinder valve. An example of such a mechanism comprises an electric actuator for opening and closing each corresponding cylinder valve in accordance with the electric signal applied to the actuator. This type of engine is sometimes referred to as a camless engine.

The invention is believed to provide an advantageous solution for soot filter regeneration because it is possible to implement in an existing engine at no added hardware cost by providing the processor with an operating program embodying an appropriate algorithm, provided that the engine, has a processor-based control and a variable valve actuation mechanism. To the extent that the disclosed embodiment uses certain data inputs for the operating program, they are already available. The invention is also believed to be more fuel-efficient than the known method referred to above.

Accordingly, a fundamental aspect of the present invention relates to a novel system and strategy for regeneration of a soot filter in an exhaust system of an internal combustion engine, especially a compression ignition, or diesel, engine that also has a variable valve actuation mechanism for varying the timing of cylinder intake and exhaust valves. The invention comprises causing the variable valve actuation mechanism to change the timing of the engine cylinder valves during the engine cycle in a manner that causes elevation of the temperature of flow through the exhaust system to a temperature that is effective to combust particles that have been trapped by the filter, thereby regenerating the filter.

One general aspect of the claimed invention relates to a method of regenerating a particulate filter that traps combustible particulates in an exhaust system of an internal combustion engine that has a variable valve actuation mechanism for varying the opening and closing times of exhaust valves that control flow from cylinders of the engine into the exhaust system and for varying the opening and closing times of intake valves that control flow into the cylinders from an intake system of the engine. A first more particular aspect of the method comprises, with the engine running under its own power, operating the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter. A second more particular aspect of the method comprises, with the engine running under its own power, operating the variable valve actuation mechanism to advance the closing of the intake valves toward bottom dead center (BDC), and as a result, elevate the temperature of flow through the exhaust system to a temperature that is effective to combust particles that have been trapped by the filter, thereby regenerating the filter. These two more particular aspects may be utilized independently or conjunctively.

Still another aspect relates to an engine that embodies one or both of these more particular aspects.

Another general aspect relates to a control for controlling a variable valve actuation mechanism of an internal combustion engine to regenerate a particulate filter in the exhaust system of such an engine. The control comprises an operating program for regenerating the particulate filter while the engine is running under its own power by causing the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

BRIEF DESCRIPTION OF THE DRAWINGS

FIG. 2 is an exemplary flow diagram of an algorithm used in practicing the invention.

FIG. 3 is a representative timing diagram for intake and exhaust valves illustrating certain principles of the invention.

FIG. 4 is an exemplary flow diagram of another algorithm that can be used in practicing the invention.

FIG. 5 is another representative timing diagram for intake and exhaust valves illustrating certain principles of the invention.

DESCRIPTION OF THE PREFERRED EMBODIMENT

Figure 1:
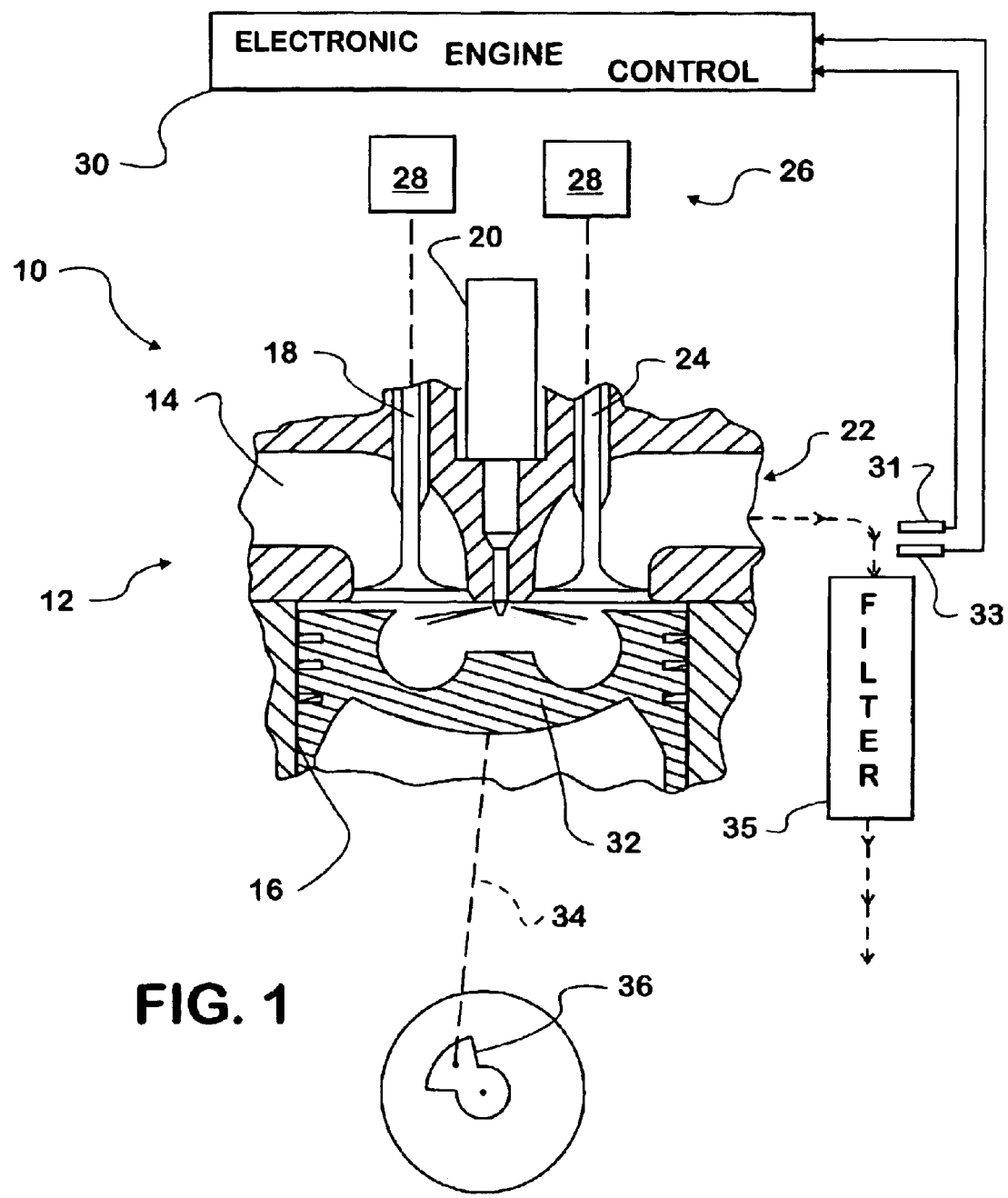
FIG. 1 is a general schematic diagram of an exemplary compression ignition engine, in accordance with principles of the present invention.

FIG. 1 illustrates a multi-cylinder internal combustion engine 10 that powers a motor vehicle. An example of such a vehicle is a truck having a chassis containing a powertrain in which engine 10 is a fuel-injected diesel engine operatively coupled through a drivetrain to driven wheels for propelling the vehicle.

Engine 10 comprises an intake system 12, including an intake manifold 14, through which charge air is delivered to cylinders 16 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24 into exhaust system 22.

Engine 10 comprises a variable valve actuation mechanism 26 that allows the time of intake valve opening and closing and the time of exhaust valve opening and closing to be varied. Such an engine is sometimes referred to as a camless engine, meaning one where each of the normally closed intake and exhaust valves is opened at a desired time in the engine operating cycle by applying an electric signal to a respective electric actuator 28. Termination of the signal results in re-closing of the associated valve.

An electronic engine control 30 that possesses digital processing capability is associated with engine 10. Control 30 may comprise one or more processors that process data from various input data sources in accordance with one or more programmed algorithms to provide an operating program that generates certain data for performance of various functions associated with operation of engine 10. Certain data processed by control 30 represents variables and may originate at external sources (input variables) and/or be generated internally of control 30 (local variables). Other data may be programmed into and stored in control 30. From input and/or programmed data, control 30 develops data for operating the intake and exhaust valve actuators 28 and for operating fuel injectors 20. Data used in the disclosed example include the temperature of the exhaust gas passing through exhaust system 25 and the pressure in the exhaust system. Each can be obtained from a respective sensor that is often a standard component of the engine system, namely, a temperature sensor 31 and a pressure sensor 33.

Exhaust system 25 further comprises a particulate, or soot, filter 35 that traps certain particulate material entrained in the exhaust flow so that such particulates do not escape to the ambient surroundings. A constituent of the particulate material is combustible particulates, sometimes referred to as soot, essentially carbon particles. Various particulate filters are available, and they typically require regeneration at times during their useful lives. Regeneration involves removing the trapped soot, and this can be performed by heating the temperature of the exhaust to a sufficiently high temperature and supplying sufficient oxygen to cause the trapped soot to combust into carbon dioxide gas that entrains with the hot combustion gases passing through the exhaust system to the ambient atmosphere.

Engine 10 further comprises a kinematic mechanism, including pistons 32 that reciprocate within cylinders 16 and are coupled by rods 34 to a crankshaft 36. When running, the engine executes the usual 720° engine cycle comprising intake, compression, power, and exhaust strokes, each of the four strokes being of 180° duration. Intake and power strokes occur on downstrokes of pistons 32 while compression and exhaust strokes occur on upstrokes. As injected fuel is combusted in cylinders 16 during each engine cycle, the energy of combustion is converted to crankshaft output torque to run the engine and operate the motor vehicle.

Engine control 30 contains a software operating program that implements the one or more algorithms used for control of engine operation, including control of timing of valves 18 and 24 via mechanism 26, and fueling of cylinders 16 via fuel injectors 20. One of the algorithms is embodied as an operating program for causing regeneration of filter 35 in accordance with principles of the present invention. An example of such an algorithm is presented in FIG. 2 where it is designated by the reference numeral 50.

When algorithm 50 is executed, it performs a series of steps that result in the performance of certain functions involving engine 10. A first series of steps 52 involves an evaluation to determine if filter 35 needs regeneration. Any process that is suitable for making this evaluation can be employed, the one shown here being representative. One step 54 comprises processing data defining the current exhaust pressure obtained from sensor 33 and the current exhaust temperature obtained from sensor 31. Another step 56 comprises determining soot accumulation in filter 35. If a subsequent step 58 then determines on the basis of the results of steps 54 and 56 that regeneration is needed, valve overlap, as described earlier, is reduced, as shown by a step 60. If step 58 determines that regeneration is not needed, a trigger is set (step 61) to trigger another evaluation at a later time.

FIG. 3 graphically shows an example of valve overlap and how that overlap can be varied. Trace 62 relates the extent of opening of an exhaust valve 24 for a respective cylinder in relation to that portion of an engine cycle in the vicinity of top dead center (TDC) of the corresponding piston 32 as the piston completes an exhaust stroke and commences an intake stroke. Trace 62 shows the exhaust valve in the process of closing as the piston approaches TDC. Trace 64 relates the extent of opening of an intake valve 18 for the same cylinder in relation to that same portion of an engine cycle. Trace 64 shows the intake valve in the process of opening as the piston approaches TDC. Valve overlap occurs when both valves are simultaneously open and is represented by the double-headed arrow 66.

By decreasing the amount of overlap, i.e. by decreasing the fraction of an engine operating cycle for which both intake and exhaust valves for a respective cylinder are simultaneously open as a piston in the respective cylinder approaches top dead center to complete an exhaust stroke, the temperature of the flow leaving the cylinders and passing through exhaust system 25 can be elevated to a temperature that is effective to combust particles that have been trapped by filter 35, thereby regenerating the filter. Reducing the amount of overlap will decrease the length of arrow 66, while increasing the amount of overlap will increase its length.

Because variable valve actuation mechanism 26 controls the timing of the opening and closing of both intake valves 18 and exhaust valves 24, it can serve to set the amount of valve overlap, and hence the length of arrow 66 in the graph plot of FIG. 3. In addition to setting the amount of overlap, variable valve actuation mechanism 26 can control where the overlap occurs during the engine cycle, i.e. the location of arrow 66 along the horizontal axis. Hence, the reader can appreciate that valve overlap may be varied in different ways, such as by controlling only the intake valves, by controlling only the exhaust valves, or by controlling both the intake and exhaust valves.

The remainder of FIG. 2 illustrates how the operating program that embodies algorithm 50 continues the regeneration of filter 35 once valve overlap has been reduced to initiate regeneration. A step 70 compares current exhaust temperature data from sensor 31 with a predefined reference that represents a low temperature limit (400° C. in the example) below which additional action needs to be taken in order to elevate the exhaust gas temperature so that the flow through the exhaust system will exceed the low temperature limit. If the current exhaust temperature exceeds the reference, the algorithm calls for no such additional action, in which case a further step 72 that monitors filter 35 for completeness of regeneration is performed. If step 72 determines that regeneration is complete, the algorithm concludes, and valve operation ceases to be under control of the operating program embodying algorithm 50.

If step 72 determines that regeneration is not yet complete, the algorithm again processes exhaust temperature data by a further step 74, but now by comparing current exhaust temperature with a different predefined reference that represents a high temperature limit (600° C. in the example) above which the amount of valve overlap should be increased in order to reduce the exhaust temperature. If step 74 determines that exhaust temperature is less than the latter reference, the operating program simply continues in a loop 76 of the algorithm. So long as measured exhaust temperature remains within the predefined limits, regeneration continues either until complete, or until one of the temperature limits is exceeded.

If the high temperature limit is exceeded, execution of a step 77 begins to increase valve overlap. The algorithm then performs a step 78 that is the same as step 72. If step 78 determines that regeneration is incomplete, the algorithm returns to loop 76. If step 78 determines that regeneration is complete, the algorithm concludes, and valve operation ceases to be under control of the operating program embodying algorithm 50.

Whenever step 70 is performed, and the result of the comparison discloses that the exhaust temperature has fallen below the low temperature limit, the additional action to be taken to elevate the exhaust gas temperature comprises altering the injection of fuel into each respective cylinder. This can be done by a secondary, post injection, as shown by step 80 in FIG. 2. Once such injections have begun, a step 82 compares exhaust temperature with the high temperature limit. If the exhaust temperature does not exceed the high temperature limit, the algorithm reverts to step 70. If the exhaust temperature does exceed the high temperature limit, a step 84 scales back the secondary injections, after which the algorithm reverts to step 78.

From the foregoing description of algorithm 50, the reader can appreciate that primary control of soot filter regeneration is performed via control of variable valve actuation mechanism 26. Under certain conditions where initial reduction in valve overlap is insufficient to attain temperatures needed for regeneration, supplemental heating is provided by secondary fuel injection. Exhaust temperature is limited to a maximum by scaling back secondary fuel injection, if previously invoked, or by increasing the fraction of an engine operating cycle for which both intake and exhaust valves for a respective cylinder are simultaneously open as a piston in the respective cylinder approaches top dead center to complete an exhaust stroke, if the fraction had previously been decreased when regeneration was initiated.

FIGS. 4 and 5 relate to another algorithm 50A, that is like algorithm 50 except in two respects, namely, steps 60 and 77. Instead of changing valve overlap as described above, algorithm replaces step 60 by a step 60A of advancing intake valve closing toward bottom dead center, and step 77 by a step 77A of retarding intake valve closing. Prior to initiation of regeneration, intake valve 18 closes as piston 32 upstrokes. Step 60A initiates regeneration by causing valve 18 to close earlier. The closing is advanced toward BDC and may still occur during the piston upstroke. However, closing may be advanced even further to occur at, or even before, BDC. It is believed that algorithm 50A may, for certain engine conditions, result in less smoke generation than algorithm 50. It should be appreciated however that each of the disclosed methods may be used independently or conjunctively depending on various engine considerations.

While a presently preferred embodiment of the invention has been illustrated and described, it should be appreciated that principles of the invention are applicable to all embodiments and uses that fall within the scope of the following claims.

What is claimed is:

1. A method of regenerating a particulate filter that traps combustible particulates in an exhaust system of an internal combustion engine that has a variable valve actuation mechanism for varying the opening and closing times of exhaust valves that control flow from cylinders of the engine into the exhaust system and for varying the opening and closing times of intake valve that control flow into the cylinders from an intake system of the engine, the method comprising:

with the engine running under its own power, operating the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter, including, after the variable valve actuation mechanism has been operated to decrease the fraction of an engine operating cycle for which both intake and exhaust valves for a respective cylinder are simultaneously open as a piston in the respective cylinder approaches top dead center to complete an exhaust stroke, the steps of measuring the temperature of flow through the exhaust system, of comparing the measured temperature with a reference that defines a low temperature limit that distinguishes between a condition calling for further elevation of the temperature of flow through the exhaust system and a condition that does not call for such further elevation, of altering engine operation to cause the temperature of flow out of the respective cylinder into the exhaust system to increase if the comparison discloses that the measured temperature does not exceed the reference, of measuring the temperature of flow through the exhaust system after regeneration has been initiated and engine operation has been so altered, of comparing the latter measured temperature with a reference that defines a high temperature limit for the flow, and if the latter measured temperature exceeds the latter reference, of operating the variable valve actuation mechanism to increase the fraction of an engine operating cycle for which both intake and exhaust valves for a respective cylinder are simultaneously open as a piston in the respective cylinder approaches top dead center to complete an exhaust stroke so as to reduce the temperature of flow below the high temperature limit.

2. A method as set forth in claim 1 including the further steps of detecting a condition where the filter has been regenerated sufficiently to allow discontinuance of regeneration, and of discontinuing regeneration when the latter condition has been detected.

3. A method of regenerating a particulate filter that traps combustible particulates in an exhaust system of an internal combustion engine that has a variable valve actuation mechanism for varying the opening and closing times of exhaust valves that control flow from cylinders of the engine into the exhaust system and for varying the opening and closing times of intake valves that control flow into the cylinders from an intake system of the engine, the method comprising:

with the engine running under its own power, operating the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter, including the steps of measuring the temperature of flow through the exhaust system, of comparing the measured temperature with a reference that defines a low temperature limit that distinguishes between a condition calling for further elevation of the temperature of flow through the exhaust system and a condition that does not call for such further elevation, of altering injection of fuel into the respective cylinder to cause the temperature of flow out of the respective cylinder into the exhaust system to increase if the comparison discloses that the measured temperature does not exceed the reference, of measuring the temperature of flow through the exhaust system while the altered injection of fuel into the respective cylinder is causing the temperature of flow out of the respective cylinder into the exhaust system to increase, of comparing the latter measured temperature with a reference that defines a high temperature limit for the flow, and of discontinuing the altered injection of fuel into the respective cylinder if the latter measured temperature exceeds the latter reference, including the further steps of measuring the temperature of flow through the exhaust system after the altered injection of fuel into the respective cylinder has been discontinued, of comparing the latter measured temperature with the reference that defines a high temperature limit for the flow, and if the latter measured temperature exceeds the latter reference, of operating the variable valve actuation mechanism to increase the fraction of an engine operating cycle for which both intake and exhaust valves for a respective cylinder are simultaneously open as a piston in the respective cylinder approaches top dead center to complete an exhaust stroke so as to reduce the temperature of flow below the high temperature limit.

4. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders;

intake valves for controlling communication of the cylinders with the intake system;

an exhaust system through which products of combustion are exhausted from the cylinders, including a particulate filter for trapping combustible particulates to prevent their introduction into the ambient surroundings;

exhaust valves for controlling communication of the cylinders with the exhaust system;

a variable valve actuation mechanism for varying the opening and closing times of the intake and exhaust valves;

a control for controlling engine operation, including controlling the variable valve actuation mechanism, the control comprising an operating program for regenerating the particulate filter while the engine is running under its own power by causing the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter, including sensors supplying certain data about the exhaust system to the control, and wherein the operating program processes the data from the sensors for detecting a condition where the filter has trapped an amount of particulates that makes regeneration appropriate and upon detecting that condition causes regeneration to be initiated, wherein one of the sensors comprises a temperature sensor for supplying temperature data representing the temperature of flow through the exhaust system, and after the variable valve actuation mechanism has decreased the fraction of an engine operating cycle for which both intake and exhaust valves for a respective cylinder are simultaneously open as a piston in the respective cylinder approaches top dead center to complete an exhaust stroke, to thereby elevate the temperature of flow through the exhaust system to a temperature that is effective to combust particles that have been trapped by the filter, the operating program compares the temperature data with a reference that defines a low temperature limit that distinguishes between a condition calling for further elevation of the temperature of flow through the exhaust system and a condition that does not call for such further elevation, if the comparison discloses that the measured temperature does not exceed the reference, the operating program alters engine operation to cause the temperature of flow out of the respective cylinder into the exhaust system to increase, and wherein after regeneration has been initiated, the operating program compares the current temperature data with a reference that defines a high temperature limit for the flow, and when the latter comparison discloses that the flow temperature exceeds the reference, causes the variable valve actuation mechanism to increase the fraction of an engine operating cycle for which both intake and exhaust valves for a respective cylinder are simultaneously open as a piston in the respective cylinder approaches top dead center to complete an exhaust stroke so as to reduce the temperature of flow below the high temperature limit.

5. An internal combustion engine as set forth in claim 4 wherein the operating program processes the data from the sensors for detecting a condition where the filter has been regenerated sufficiently to allow discontinuance of regeneration, and upon detecting the latter condition causes regeneration to be discontinued.

6. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders;

intake valves for controlling communication of the cylinders with the intake system;

an exhaust system through which products of combustion are exhausted from the cylinders, including a particulate filter for trapping combustible particulates to prevent their introduction into the ambient surroundings;

exhaust valves for controlling communication of the cylinders with the exhaust system;

a variable valve actuation mechanism for varying the opening and closing times of the intake and exhaust valves;

a control for controlling engine operation, including controlling the variable valve actuation mechanism, the control comprising an operating program for regenerating the particulate filter while the engine is running under its own power by causing the variable valve actuation mechanism to decrease the fraction of an engine operating cycle for which both intake and exhaust valves for a respective cylinder are simultaneously open as a piston in the respective cylinder approaches top dead center to complete an exhaust stroke, and as a result, elevate the temperature of flow through the exhaust system to a temperature that is effective to combust particles that have been trapped by the filter, thereby regenerating the filter, including sensors supplying certain data about the exhaust system to the control, and wherein the operating program processes the data from the sensors for detecting a condition where the filter has trapped an amount of particulates that makes regeneration appropriate and upon detecting that condition causes regeneration to be initiated, wherein one of the sensors comprises a temperature sensor for supplying temperature data representing the temperature of flow through the exhaust system, and the operating program compares the temperature data with a reference that defines a low temperature limit that distinguishes between a condition calling for further elevation of the temperature of flow through the exhaust system and a condition that does not call for such further elevation, wherein the operating program causes alteration of the injection of fuel into the respective cylinder so as to increase the temperature of flow out of the respective cylinder into the exhaust system if the comparison discloses that the temperature data does not exceed the reference, and the operating program compares the current temperature data with a reference that defines a high temperature limit for the flow while the altered injection of fuel is increasing temperature of the flow, and if the latter comparison discloses that the current temperature data exceeds the latter reference, causes the alteration of the injection of fuel into the respective cylinder to be discontinued, wherein the operating program compares the current temperature data with the reference that defines a high temperature limit for the flow after the operating program has caused the alteration of the injection of fuel into the respective cylinder to be discontinued, and if the latter comparison discloses that the current temperature data exceeds the reference that defines a high temperature limit for the flow, the operating program causes the variable valve actuation mechanism to increase the fraction of an engine operating cycle for which both intake and exhaust valves for the respective cylinder are simultaneously open as a piston in the respective cylinder approaches top dead center to complete an exhaust stroke to reduce the temperature of flow below the high temperature limit.

7. A method of regenerating a particulate filter that traps combustible particulates in an exhaust system of an internal combustion engine that has a variable valve actuation mechanism for varying the closing times of intake valves that control flow into the cylinders from an intake system of the engine, the method comprising:

with the engine running under its own power, operating the variable valve actuation mechanism to advance the closing of the intake valves toward bottom dead center or early, and as a result, elevate the temperature of flow through the exhaust system to a temperature that is effective to combust particles that have been trapped by the filter, thereby regenerating the filter, further including the steps of measuring the temperature of flow through the exhaust system, of comparing the measured temperature with a reference that defines a low temperature limit that distinguishes between a condition calling for further elevation of the temperature of flow through the exhaust system and a condition that does not call for such further elevation, of altering injection of fuel into the cylinders to cause the temperature of flow out of the cylinders into the exhaust system to increase if the comparison discloses that the measured temperature does not exceed the reference, measuring the temperature of flow through the exhaust system while the altered injection of fuel into the cylinders is causing the temperature of flow out of the cylinders into the exhaust system to increase, comparing the latter measured temperature with a reference that defines a high temperature limit for the flow, and discontinuing the altered injection of fuel into the cylinders if the latter measured temperature exceeds the latter reference, of measuring the temperature of flow through the exhaust system after the altered injection of fuel into the cylinders has been discontinued, of comparing the latter measured temperature with the reference that defines a high temperature limit for the flow, and if the latter measured temperature exceeds the latter reference, of operating the variable valve actuation mechanism to retard the closing of the intake valves, and as a result, reduce the temperature of flow below the high temperature limit.

8. A method as set forth in claim 7 further including the steps of detecting a condition where the filter has trapped an amount of particulates that makes regeneration appropriate, of initiating regeneration when that condition has been detected, of detecting a condition where the filter has been regenerated sufficiently to allow discontinuance of regeneration, and of discontinuing regeneration when the latter condition has been detected.

9. An internal combustion engine comprising:

multiple engine cylinders within which combustion occurs and a kinematic mechanism, including pistons that reciprocate within the cylinders, through which energy of combustion is converted to a torque output;

an intake system through which charge air is delivered to the cylinders;

intake valves for controlling communication of the cylinders with the intake system;

an exhaust system through which products of combustion are exhausted from the cylinders, including a particulate filter for trapping combustible particulates to prevent their introduction into the ambient surroundings;

a variable valve actuation mechanism for varying the closing times of the intake valves;

a control for controlling engine operation, including controlling the variable valve actuation mechanism, the control comprising an operating program for regenerating the particulate filter while the engine is running under its own power by causing the variable valve actuation mechanism to advance the closing of the intake valves, and as a result, elevate the temperature of flow through the exhaust system to a temperature that is effective to combust particles that have been trapped by the filter, thereby regenerating the filter;

sensors supplying certain data about the exhaust system to the control;

wherein the operating program processes the data from the sensors for detecting a condition where the filter has trapped an amount of particulates that makes regeneration appropriate and upon detecting that condition causes regeneration to be initiated, the operating program processes the data from the sensors for detecting a condition where the filter has been regenerated sufficiently to allow discontinuance of regeneration, and upon detecting the latter condition causes regeneration to be discontinued, one of the sensors comprises a temperature sensor for supplying temperature data representing the temperature of flow through the exhaust system, the operating program compares the temperature data with a reference that defines a low temperature limit that distinguishes between a condition calling for further elevation of the temperature of flow through the exhaust system and a condition that does not call for such further elevation, causes alteration of the injection of fuel into the cylinders so as to increase the temperature of flow out of the cylinders into the exhaust system if the comparison discloses that the temperature data does not exceed the reference, compares the current temperature data with a reference that defines a high temperature limit for the flow while the altered injection of fuel is increasing temperature of the flow, and if the latter comparison discloses that the current temperature data exceeds the latter reference, causes the alteration of the infection of fuel into the cylinders to be discontinued;

wherein the operating program compares the current temperature data with the reference that defines a high temperature limit for the flow after the operating program has caused the alteration of the injection of fuel into the cylinders to be discontinued, and if the latter comparison discloses that the current temperature data exceeds the reference that defines a high temperature limit for the flow, the operating program causes the variable valve actuation mechanism to retard the closing of the intake valves, and as a result reduce the temperature of flow below the high temperature limit.

10. A method of regenerating a particulate filter that traps combustible particulates in an exhaust system of an internal combustion engine that has a variable valve actuation mechanism for varying the closing times of intake valves that control flow into the cylinders from an intake system of the engine, the method comprising:

with the engine running under its own power, operating the variable valve actuation mechanism to advance the closing times of the intake valves toward bottom dead center or earlier during engine operating cycles, and as a result, elevate the temperature of flow through the exhaust system to a temperature that is effective to combust particles that have been trapped by the filter, thereby regenerating the filter, including, after the variable valve actuation mechanism has been operated to advance the closing times of the intake valves toward bottom dead center or earlier during the engine operating cycles, the steps of measuring the temperature of flow through the exhaust system, of comparing the measured temperature with a reference that defines a low temperature limit that distinguishes between a condition calling for further elevation of the temperature of flow through the exhaust system and a condition that does not call for such further elevation, of altering engine operation to cause the temperature of flow out of the respective cylinder into the exhaust system to increase if the comparison discloses that the measured temperature does not exceed the reference, of measuring the temperature of flow through the exhaust system after regeneration has been initiated and engine operation has been so altered, of comparing the latter measured temperature with a reference that defines a high temperature limit for the flow, and if the latter measured temperature exceeds the latter reference, of operating the variable valve actuation mechanism to retard the closing of the intake valves, and as a result, reduce the temperature of flow below the high temperature limit.

11. A method of regenerating a particulate filter that traps combustible particulates in an exhaust system of an internal combustion engine that has a variable valve actuation mechanism for varying the cloning times of intake valves that control flow into the cylinders from an intake system of the engine, the method comprising:

with the engine running under its own power, operating the variable valve actuation mechanism to advance the closing of the intake valves toward bottom dead center or earlier during engine operating cycles, and as a result, elevate the temperature of flow through the exhaust system to a temperature that is effective to combust particles that have been trapped by the filter, thereby regenerating the filter, including the steps of measuring the temperature of flow through the exhaust system, of comparing the measured temperature with a reference that defines a low temperature limit that distinguishes between a condition calling for further elevation of the temperature of flow through the exhaust system and a condition that does not call for such further elevation, of altering injection of fuel into the respective cylinder to cause the temperature of flow out of the respective cylinder into the exhaust system to increase if the comparison discloses that the measured temperature does not exceed the reference, of measuring the temperature of flow through the exhaust system while the altered injection of fuel into the respective cylinder is causing the temperature of flow out of the respective cylinder into the exhaust system to increase, of comparing the latter measured temperature with a reference that defines a high temperature limit for the flow, and of discontinuing the altered injection of fuel into the respective cylinder if the latter measured temperature exceeds the latter reference, including the further steps of measuring the temperature of flow through the exhaust system after the altered injection of fuel into the respective cylinder has been discontinued, of comparing the latter measured temperature with the reference that defines a high temperature limit for the flow, and if the latter measured temperature exceeds the latter reference, of operating the variable valve actuation mechanism to retard the closing of the intake valves so as to reduce the temperature of flow below the high temperature limit.

12. An internal combustion engine comprising;

multiple engine cylinders within which combustion occurs and a kinematic mechanism, including pistons that reciprocate within the cylinders, through which energy of combustion is converted to a torque output;

an intake system through which charge air is delivered to the cylinders;

intake valves for controlling communication of the cylinders with the intake system, an exhaust system through which products of combustion are exhausted from the cylinders, including a particulate filter for trapping combustible particulates to prevent their introduction into the ambient surroundings;

a variable valve actuation mechanism for varying the opening and closing times of the intake valves;

a control for controlling engine operation, including controlling the variable valve actuation mechanism, the control comprising an operating program for regenerating the particulate filter while the engine is running under its own power by causing the variable valve actuation mechanism to advance the closing times of the intake valves during engine operating cycles, and as a result, elevate the temperature of flow through the exhaust system to a temperature that is effective to combust particles that have been trapped by the filter, thereby regenerating the filter, including sensors supplying certain data about the exhaust system to the control, and wherein the operating program processes the data from the sensors for detecting a condition where the filter has trapped an amount of particulates that makes regeneration appropriate and upon detecting that condition causes regeneration to be initiated, wherein one of the sensors comprises a temperature sensor for supplying temperature data representing the temperature of flow through the exhaust system, and after the variable valve actuation mechanism has advanced the closing times of the intake valves, to thereby elevate the temperature of flow through the exhaust system to a temperature that is effective to combust particles that have been trapped by the filter, the operating program compares the temperature data with a reference that defines a low temperature limit that distinguishes between a condition calling for further elevation of the temperature of flow through the exhaust system and a condition that does not call for such further elevation, if the comparison discloses that the measured temperature does not exceed the reference, the operating program alters engine operation to cause the temperature of flow out of the respective cylinder into the exhaust system to increase, and wherein after regeneration has been initiated, the operating program compares the current temperature data with a reference that defines a high temperature limit for the flow, and when the latter comparison discloses that the flow temperature exceeds the reference, causes the variable valve actuation mechanism to retard the closing times of the intake valves so as to reduce the temperature of flow below the high temperature limit.

13. An internal combustion engine comprising;
multiple engine cylinders within which combustion occurs and a kinematic mechanism, including pistons that reciprocate within the cylinders, through which energy of combustion is converted to a torque output;
an intake system through which charge air is delivered to the cylinders;
intake valves for controlling communication of the cylinders with the intake system;
an exhaust system through which products of combustion are exhausted from the cylinders, including a particulate filter for trapping combustible particulates to prevent their introduction into the ambient surroundings;
a variable valve actuation mechanism for varying the opening and closing times of the intake valves;
a control for controlling engine operation, including controlling the variable valve actuation mechanism, the control comprising an operating program for regenerating the particulate filter while the engine is running under its own power by causing the variable valve actuation mechanism to advance the closing of the intake valves during engine operating cycles, and as a result, elevate the temperature of flow through the exhaust system to a temperature that is effective to combust particles that have been trapped by the filter, thereby regenerating the filter, including sensors supplying certain data about the exhaust system to the control, and wherein the operating program processes the data from the sensors for detecting a condition where the filter has trapped an amount of particulates that makes regeneration appropriate and upon detecting that condition causes regeneration to be initiated, wherein one of the sensors comprises a temperature sensor for supplying temperature data representing the temperature of flow through the exhaust system, and the operating program compares the temperature data with a reference that defines a low temperature limit that distinguishes between a condition calling for further elevation of the temperature of flow through the exhaust system and a condition that does not call for such further elevation, wherein the operating program causes alteration of the injection fuel into the respective cylinder so as to increase the temperature of flow out of the respective cylinder into the exhaust system if the comparison discloses that the temperature data does not exceed the reference, and the operating program compares the current temperature data with a reference that defines a high temperature limit for the flow while the altered injection of fuel is increasing temperature of the flow, and if the latter comparison discloses that the current temperature data exceeds the latter reference, causes the alteration of the injection of fuel into the respective cylinder to be discontinued, wherein the operating program compares the current temperature data with the reference that defines a high temperature limit for the flow after the operating program has caused the alteration of the injection of fuel into the respective cylinder to be discontinued, and if the latter comparison discloses that the current temperature data exceeds the reference that defines a high temperature limit for the flow, the operating program causes the variable valve actuation mechanism to retard the closing of the intake valves to reduce the temperature of flow below the high temperature limit.

* * * * *